United States Patent [19]

Jungmeister

[11] 4,441,185

[45] Apr. 3, 1984

[54] MONITORING METHOD AND DEVICE FOR A PCM REGENERATOR HAVING A CODE RULE VIOLATION CHECKING DEVICE

[75] Inventor: Hans G. Jungmeister, Munich, Fed. Rep. of Germany

[73] Assignee: Siemens Aktiengesellschaft, Berlin & Munich, Fed. Rep. of Germany

[21] Appl. No.: 285,547

[22] Filed: Jul. 21, 1981

[30] Foreign Application Priority Data

Jul. 22, 1980 [DE] Fed. Rep. of Germany ....... 3027735
Jan. 21, 1981 [DE] Fed. Rep. of Germany ....... 3101797

[51] Int. Cl.³ .............................................. G06F 11/30
[52] U.S. Cl. .......................................... 371/56; 371/3; 375/4
[58] Field of Search .......................... 371/56, 3; 375/4

[56] References Cited

U.S. PATENT DOCUMENTS

| | | | |
|---|---|---|---|
| 3,866,147 | 2/1975 | Courreur et al. | 371/56 |
| 4,078,157 | 3/1978 | Lender et al. | 375/4 |
| 4,078,159 | 3/1978 | Lender et al. | 375/4 |
| 4,086,566 | 4/1978 | Lender | 371/56 |
| 4,276,649 | 6/1981 | Groenendaal et al. | 371/56 |
| 4,337,457 | 6/1982 | Tache | 371/56 X |

OTHER PUBLICATIONS

Williams et al., "Monitoring Error-Correcting Circuits", *IBM Tech. Disc. Bulletin*, vol. 10, No. 11, Apr. '68, pp. 1800-1801.

*Primary Examiner*—David H. Malzahn
*Attorney, Agent, or Firm*—Hill, Van Santen, Steadman & Simpson

[57] ABSTRACT

A PCM regenerator is provided for pseudo-ternary signals occurring in the AMI code and having a connected code rule violation checking device which requires a monitoring and checking device. A problem regarding checking is that faults deliberately inserted into the transmission signal in the transmitting station are at least partially corrected in a first regenerator and are therefore not transmitted farther. The process, in accordance with the invention, provides the possibility that in each individual regenerator, specific portions of the regenerator may be monitored by the production of checking pulses and selectively in addition by the monitoring of the voltages at specific outputs. The invention is suitable for use in PCM lengths employing element speeds of a few 100 Mbit/s.

11 Claims, 3 Drawing Figures

MONITORING METHOD AND DEVICE FOR A PCM REGENERATOR HAVING A CODE RULE VIOLATION CHECKING DEVICE

BACKGROUND OF THE INVENTION

1. Field of the Invention

The present invention relates to a method and to an arrangement for monitoring a regenerator for pseudo-ternary digital signals which contains a code rule violation checking device with a fault counter and which, at at least two inner terminals, produces two amplitude regenerated unipolar pulse trains and time regenerated universal pulse trains, one of which represents the positive input pulses and one of which represents the negative input pulses.

2. Description of the Prior Art

By combining a plurality of digitized speech signals or data signals to form a time division multiplex (TDM) signal and by combining a plurality of TDM signals, one finally obtains digital TDM signals having bit rates which can amount to a few hundred Mbit/s. TDM signals of this type are frequently transmitted as pseudo-ternary digital signals via copper cables because of the freedom of the transmission signal from direct current, in which case the transmission signal is frequently converted by means of an AMI code. Within the transmission link, pulse regenerators which undertake the amplitude-wise regeneration and time-wise regeneration of the transmission signal are interposed into the cable at specific intervals. The AMI code is characterized in that it consists of a pseudo-ternary code in which binary zeros are transmitted as zero elements and binary ones are transmitted alternately as plus and minus signals with a logic one level, and the polarity of the consecutive one pulses in each case changes. In the regeneration, a first unipolar pulse train is regenerated from the positive one-signals, and a second unipolar pulse train is regenerated from the negative one-signals, and the two pulse trains are regenerated amplitude-wise and time-wise separately. The regeneration is frequently effected using clocked D flip-flops and in the event of specific requirements on the amplitude regeneration, the D flip-flops are preceded by amplitude filters. Then, a code conversion is carried out for the regenerated unipolar pulse trains to form a new transmission signal represented in the AMI code. With respect to simple generation of such a signal by means of a quarter-wave stub line short-circuited at the end, in the regenerator it is desirable to convert the unipolar pulse trains into a signal represented in the binary difference code. The code rule for this code consists in that a logic one in the binary output signal is marked as a change in the logic level from zero to one or from one to zero in the binary difference code, whereas the logic zero in the binary output signal is marked as a retention of the logic level one or zero from the previous bit in the binary difference code. The operation of such a digital transmission system employing a transmission signal represented in the AMI code is monitored by using the redundancy of this code which, in fact, has at its disposal, three digital values of which, however, for the information transmission, two are used for the same state of the original signal. Employing the special property of the AMI code that the consecutive one-pulses must always occur with different polarity, by means of a code rule violation checking device it is possible to monitor the transmission signal, even when the same is scrambled by a pseudo-random sequence. An example of such a code rule violation checking device contained in a PCM regenerator is described in more detail in a parallel application, Ser. No. 284,987, filed July 20, 1981. In the event that this code rule violation checking device does not emit an error indication via a following telemetry device to an analyzing central control unit, in addition to the possibility of absolutely fault-free transmission of the digital signal, there is also the possibility of a breakdown in the code rule violation checking device. The check is further impeded by the following fact: in order not to disturb the operation, only those faults which do not change the communication to be transmitted can be deliberately inserted for test purposes in the transmitting station. However, such faults could merely be code rule violations. In systems of the kind described, however, all the code rule violations are completely removed from each intermediate regenerator. It is therefore impossible to check system of this type by means of special fault signals transmitted from the end station.

SUMMARY OF THE INVENTION

The object of the present invention is to provide for the monitoring of the code rule violation checking device during operation and also to be able to carry out a check when the transmission system is out of operation.

According to the present invention, the above object is realized, in that, in order to monitor a regenerator for PCM signals represented in the AMI code, with a time decision device comprising two clocked D flip-flops and a code rule infringement checking device, where in addition there is provided an RS flip-flop whose R input and S input are each separately connected to an output of the D flip-flops of the time decision device element where the outputs of the RS flip-flops represent the push-pull signal output for the regenerated signal and a unipolar pulse train containing the entire information can be obtained from each output terminal, where one of the inputs and one of the outputs of the RS flip-flops are connected to the two inputs of the one of two gate arrangements, and the outputs of the gate arrangements are connectd to one another and to an output for an error indication signal, the production of the checking sequences in continuous operation is effected in that one of the outputs of the D flip-flops is connected to voltage detectors whose output terminals are connected to the inputs of an analysis circuit. Further, the control outputs of the analysis circuit are connected to the base terminal of one of two switching transistors whose emitter terminals are each connected to reference potential, whose collector terminals are each connected by way of a protective resistor to one of the outputs of the assigned D flip-flops, one of the outputs of the assigned gate arrangement, and by way of a further resistor to operating potential. And in accordance with the polarity of the connected output of the D flip-flop, in both cases, an npn transistor is provided.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
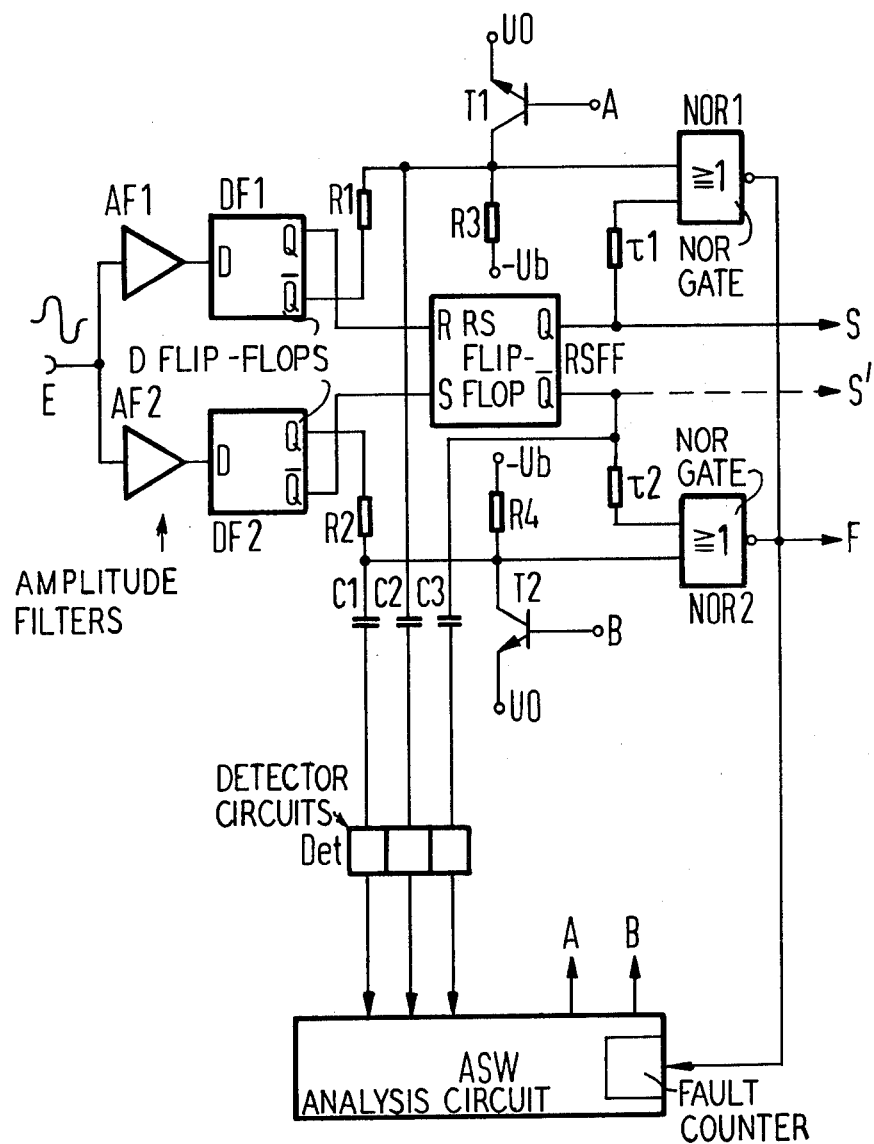
FIG. 1 is a block diagram illustration of a portion of a PCM regenerator having a code rule violation checking device and a first regenerator-side component of the monitoring device for the code rule violation checking device, and having a detector circuit.

FIG. 1 illustrates that part of the PCM regenerator which is essential to the invention and which comprises amplitude filters AF1, AF2 employed for amplitude decisions and preliminary decisions as regards the received pulses, and the clocked D flip-flops DF1, DF2 which are normally used for time decisions. Not shown are the remote feed filters and input-end equalizer required to correct the distortion of the cable frequency response, and likewise the connection between the analysis circuit and the telemetry device itself. In addition, there has been shown the connected checking and monitoring device. At an input E there is received a distortion-corrected pseudo-ternary signal which occurs in bipolar form and in the AMI code. A first amplitude filter and a second amplitude filter split the bipolar signal into two unipolar pulse trains, the positive pulses of the input signal being emitted from the first amplitude filter AF1 and the negative pulses from the second amplitude filter AF2 to the D inputs of the following D flip-flops. For a code rule violation check, the non-inverting output Q of the first D flip-flop is connected to the reset input and the inverting output $\overline{Q}$ is connected to the set input of an additional RS flip-flop RSFF. The use of the inverse output $\overline{Q}$ of the second D flip-flop takes place in the second amplitude decision device without the inversion level shift of the negative input pulses of the input signal. The other outputs of the two D flip-flops are each connected via relatively low-ohmic protective resistors R1 and R2 to the first inputs of a first NOR gate NOR1 and a second NOR gate NOR2, the second inputs of which are connected via a first delay element $\tau_1$, $\tau_2$ to the non-inverting output Q and the inverting output $\overline{Q}$ of the RS flip-flop RSFF. The signal delay of the delay circuits is set to be such that the sum of the signal delay in the RS flip-flop and in a connected delay element amounts to one bit duration. Furthermore, the outputs of the RS flip-flop are connected to the output terminals S and S' of a push-pull output for the transmission signal which occurs in a binary-difference code at these output terminals. The outputs of the two NOR gates are connected to one another in accordance with a wire link or logic link and are connected to an output F for an error indication signal to which the analysis circuit is connected via an error counter, and to which another analysis device can also be connected. In FIG. 1, the error counter has been included into the analysis circuit ASW.

One output of the D flip-flops and the RS flip-flops is in each case relatively loosely capacitively coupled via capacitors C1, C2, C3 to the individual inputs of a detector circuit Det. The detector circuit Det comprises rectifier arrangements which, during the continuous transmission of the digital signals, each produce a d.c. voltage signal which is emitted to inputs of a following analysis device.

It has been proved that the rectifier arrangement contained in the detector circuit can be eliminated so that a d.c. voltage detector can also be used as a voltage detector. The d.c. voltage detector contains an integration element having a high time constant which is followed by a threshold value switch. In place of the loose capacitive coupling, the d.c. voltage detector should be connected to the outputs of the flip-flops via resistors, in which case the values of the resistors are preferably in the kilo-ohm range.

Figure 3:
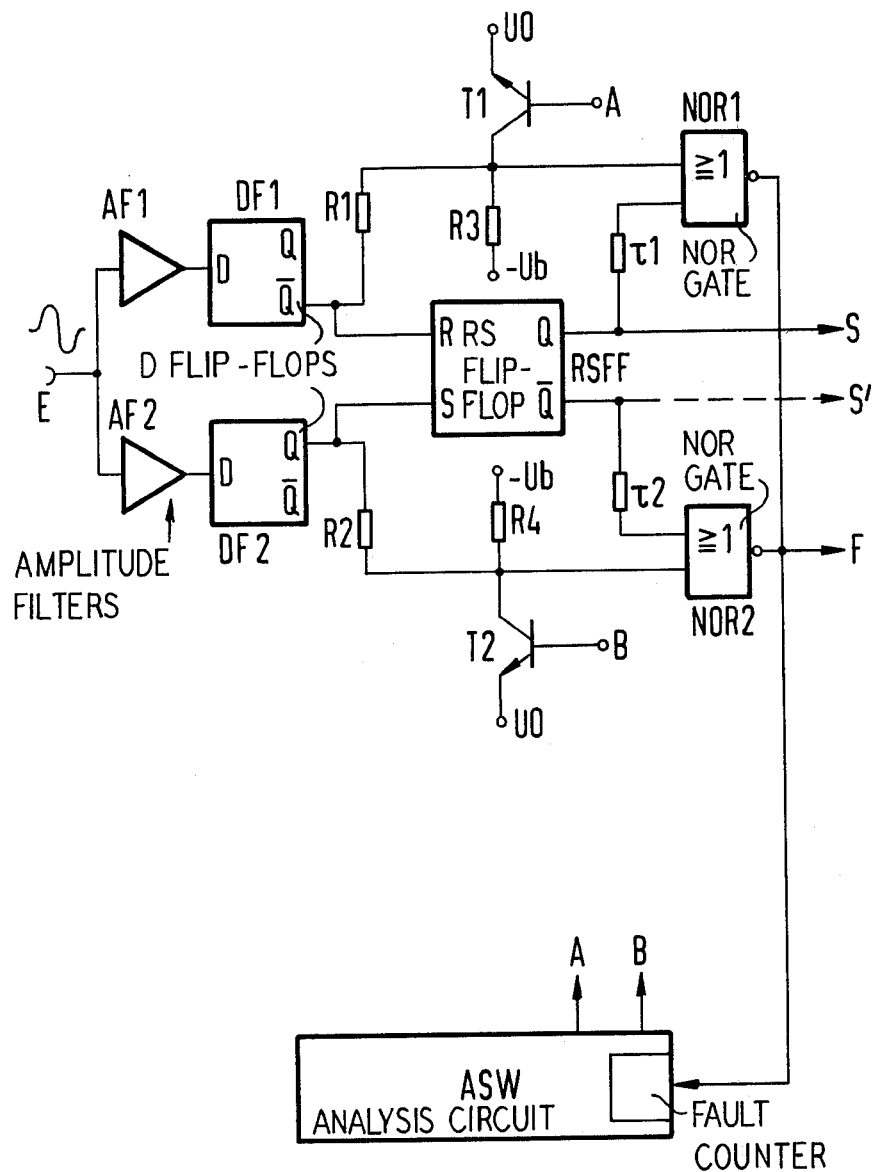
FIG. 3 illustrates a regenerator, in block diagram form, which is simplified with respect to the regenerator of FIG. 1, and which is shown without a detector circuit.

The analysis circuit ASW is represented and described in detail in FIG. 3 of the parallel German patent application P 30 27 755.5-31 in which it is attached to the circuit component referenced UEC. A control output A, B of the analysis circuit ASW is, in each case, connected to the base terminal of a first npn transistor T1 and a second npn transistor T2. The emitter terminals of these transistors are connected to a terminal for a voltage $U_o$ of approximately $-2$ V in accordance with the logic zero level. The collector terminal of the first transistor T1 is connected to the connection between the first resistor R1 and the first input of the first NOR gate, and is also connected via a third resistor R3 to the operating voltage $-U_b$ of approximately $-5$ V. The collector terminal of the second transistor T2 is connected to the length between the second resistor R2 and the first input of the second NOR gate NOR2 and, moreover, is connected by way of a fourth resistor R4 to the operating voltage $-U_b$. As transistors, pnp transistors can be used in place of the npn transistors T1 and T2 if the collector and emitter terminals are exchanged. The use of these transistors is, in fact, limited because of the smaller selection and further disadvantages, but in the present case, in the case of construction by means of AND gates, a lower control power is attained. The resistors R3 and R4 are primarily the emitter resistors of the first and second D flip-flops DF1 and DF2, as the output terminals of these flip-flops are connected directly to the emitter terminal as so-called "open emitter". Moreover, the resistors R3 and R4 serve to set the rest logic level of the following NOR gates (pull-down resistors) and, in addition, the input resistance of the NOR gates is therefore assured at the high operating frequencies. Therefore, the resistors R3 and R4 do not serve as collector resistors for the transistors T1 and T2, the collector resistors being the fundamentally lower ohmic resistors R1 and R2.

The following fault situations are possible. First of all, the inverting output $\overline{Q}$ of the first D flip-flop DF1 can constantly conduct the maximum level so that the first NOR gate NOR1 is continuously blocked. In this case, without an additional monitoring device, no message occurs at the error indication output. In the second case, the same inverting output $\overline{Q}$ of the first D flip-flop DF1 is constantly at the lowest level or oscillates or is no longer correlated with the input signal. In this case, even without an additional monitoring device, a message is fed to the error indication output and, so in this case, no additional measure is required. As a third fault situation, it is conceivable that the non-inverting output Q of the second D flip-flop is likewise constantly at the lowest level or oscillates. This situation is similar to the second case, and, therefore, even without an additional device, a message is fed to the error indication output. In a fourth situation, the non-inverting output Q of the second D flip-flop is constantly at the maximum level. In this case, which is similar to the first case, again no message is fed to the error indication output. The same applies to the fifth possibility that the inverting output $\overline{Q}$ of the RS flip-flop is constantly at a maximum level. A sixth conceivable situation is that the inverting output of the RS flip-flop is constantly at the minimum level or oscillates. This situation corresponds to the described second situation, and, therefore, even without an additional device, a message is fed to the error indication output. This also applies to a seventh situation in which one of the NOR gate outputs is constantly at the maximum level or oscillates. Finally, an eighth fault situation is conceivable in which one of the NOR gate outputs is constantly at the minimum level in which case no fault message is produced without an additional device.

The additional monitoring of the inverting output $\overline{Q}$ of the first D flip-flop, of the non-inverting output Q of the second D flip-flop, and of the inverting output $\overline{Q}$ of the RS flip-flop is effected by means of the illustrated detectors Det for alternating voltage which are coupled to these outputs via the capacitors C1, C2, C3. The capacitors possess a comparatively low capacitance value resulting in a loose capacitive coupling which does not noticeably deform the pulses occurring at these outputs. As a result of the constant change of sign in normal signal transmission, an alternating voltage must occur at all these outputs, and if this were these undershoots (or undershoot) a minimum value, a fault exists. The situation is also conceivable that this alternating voltage is produced by an undesired oscillation in which case a fault message is anyhow emitted at the error indication output.

In order to check the NOR gates, their inputs which are not connected to the RS flip-flop are alternately connected to a low level. In this case, pulses must occur at the fault output when the NOR gates operate and the alternating voltage detectors report correct levels. However, for the practical implementation of this measure, the following should be noted. In order to limit a permissible value, the currents emanating from the inverting output $\overline{Q}$ of the first D flip-flop and the non-inverting output Q of the second D flip-flop, the resistors R1 and R2 have been provided, as otherwise, the emitter output normally provided in ECL circuits would be short-circuited by the low-ohmic reduction in the NOR gate input potential. The low-ohmic reduction is required, however, in order to deactivate the operation from the emitters of the D flip-flops. It is effectively implemented by npn transistors which are brought out of the blocking state and into the saturation state by base-side control pulses. In order that the blocking state (normal operating state) of these transistors are effective, sufficient current may be obtained from the flip-flop emitters, and the resistors R3 and R4 are provided. The dimensioning of the resistors based on the rule that R1<R3 and R2<R4 in order to damp the operating signal to the least extent possible. The resistors R1 and R2 should be selected to be as small as possible, but at least sufficient in value to ensure that a maximum permissible emitter current is not overshot. The resistors R3 and R4 should be selected to be as large as possible but sufficiently low in value to ensure that the minimum required emitter current is achieved.

If the inputs of the a.c. voltage detectors are coupled to that side of the resistors R1 and R2 facing away from the D flip-flops, the latter are additionally monitored by the alternating voltage detectors. The connection of the "low" level to the first NOR gate input is effected by the npn transistor T1 whose collector terminal is connected into the length between the current-limiting resistor R1 and the input of the first NOR gate.

Similarly, the "low" level at the input of the second NOR gate NOR2 is produced by the npn transistor T2. If the collector resistors of these two transistors or the transistors themselves break down as a result of an interruption, this is recognized by the fact that during the check, in spite of the fact that the fault level is connected, no fault message appears at the output F. In the event of a breakdown due to a short circuit, there is a continuous fault message.

In addition, it is possible to include an error counter into the connection between the error indication output F and the telemetry device which transmits the error indication signal to an analyzing end section, which error counter must then be additionally monitored. Suitable for this purpose are the above-described checking processes in which a fault message must occur at the error indication output F. In this case, the error counter must also supply the following telemetry device with an item of information corresponding to its count. A practical check is effected, for example, in that at the beginning or at the end of each fault message cycle, the analysis circuit of the regenerator in question produces gate pulses having a length of a few microseconds by means of a synchronizing device. These gate pulses block two gate inputs with the consequence, that the signals obtained from the decision-making D flip-flops are switched through to the error indication output. Thus, errors are simulated, so that the error counter is switched through to its end value. For this purpose, the analysis circuit contains an additional interrogation device for the error counter. If the maximum error count is emitted to the interrogation device, under the control of the analysis circuit ASW, the fault detector is reset and the gate pulses AB for the inputs of the transistors T1 and T2 are erased. If, however, the interrogation device of the analysis circuit does not establish a maximum count, the telemetry device is supplied with a special message to the effect that a defective monitoring is signaled.

In another exemplary embodiment which has not been illustrated, the analysis circuit contains an asynchronous, therefore, free-running, error generator by means of which the checking gate pulses can be produced at arbitrary intervals of time and the results of the checking process can be transmitted, combined with an arbitrary fault message, to the telemetry device. The analysis circuit also optionally controls a control input which is connected to the telemetry device and thereby allows the checking process to start from an analysis point.

In a further exemplary embodiment, the analysis device contains a checking generator for checking pulses corresponding to the pulses of the transmission signal. The outputs of this checking generator are connected to corresponding outputs of the D flip-flops. The checking pulses are now inserted into time slots in which the decision device—if it possesses only one output—does not emit a pulse of the opposite polarity. Similarly, in the case of decision devices having two outputs, the outputs of the checking generator are controlled in such a manner that the pulse is emitted only when the decision device output which is assigned does not recognize an AMI pulse. Only in this case is it, in fact, ensured that the checking pulses are eliminated from the regenerator and do not cause transmission faults during operation.

The described device also allows checking to take place when the transmission system is out of operation. Operation is discontinued simply by cutting off the signal source in the transmitting end line terminal device of the transmission link. As a result, the aforementioned monitoring devices connected to the transmitting stages of the individual regenerators emit a signal corresponding to the fault situation "no output signal". This signal is then used to start a checking generator which alternately emits sequences of positive and negative pulses, where the pulses correspond in amplitude to the decision device output pulses and in pulse duration to at least the decision device output pulses.

The time succession of the checking pulses is not subject to a precise rule, if the code rule monitoring checking device operates asynchronously and contains only static stores. The checking pulses can also be produced by means of a comparatively simple checking generator, thus for example a relaxation oscillator or an astable multivibrator. The telemetry system which continues to operate during this measurement and which reports faults to the end station then reports from all regenerators having an intact code rule violation checking device the information provided for this situation triggered by the artificial code rule violations. The checking procedure can also consist in that, firstly, the fault signal of the monitoring device in the end stage determines that no transmission signal exists, in the regenerator flip-flops which are set which, when the line terminal device is subsequently supplied with the transmission signal, produce the gate pulses and, therefore, initiate the checking process.

As regards the explanation of the operation of an arrangement of the type illustrated in FIG. 1, it should also be noted that the entire regenerator arrangement contains further monitoring devices which have not been illustrated in FIG. 1. Therefore, for example, the regenerator end stage is connected to a monitoring device which monitors the transmission path for the digital signals. This monitoring device includes a portion of the code rule violation checking device, namely the RS flip-flop contained in the transmission path of the digital signal, in the regenerator monitoring. If the two outputs of the RSFF flip-flop have been used for push-pull operation of the end stage, and, in fact, in the form that the latter is enable to emit a signal when one of the flip-flop outputs breaks down, the monitoring of the flip-flop from the end stage is complete. In this case, the detector which is to be connected to the inverting output Q of the RS flip-flop is superfluous.

In the event of a single-channel input of the end stage, however, only the non-inverting output of the RS flip-flop is monitored from the end stage so that the detector to be connected to the inverting output of the RS flip-flop is initially needed.

If the output signal of the RS flip-flop is no longer correlated with the input signal, for example as a result of oscillations, the monitoring device connected to the end stage itself emits a message to a central fault output. Therefore, additional monitoring is required for the two outputs, not connected to the RS flip-flop, of the two D flip-flops and for the two NOR gates possibly for the inverting output $\overline{Q}$ of the RS flip-flop and for an error counter.

Figure 2:
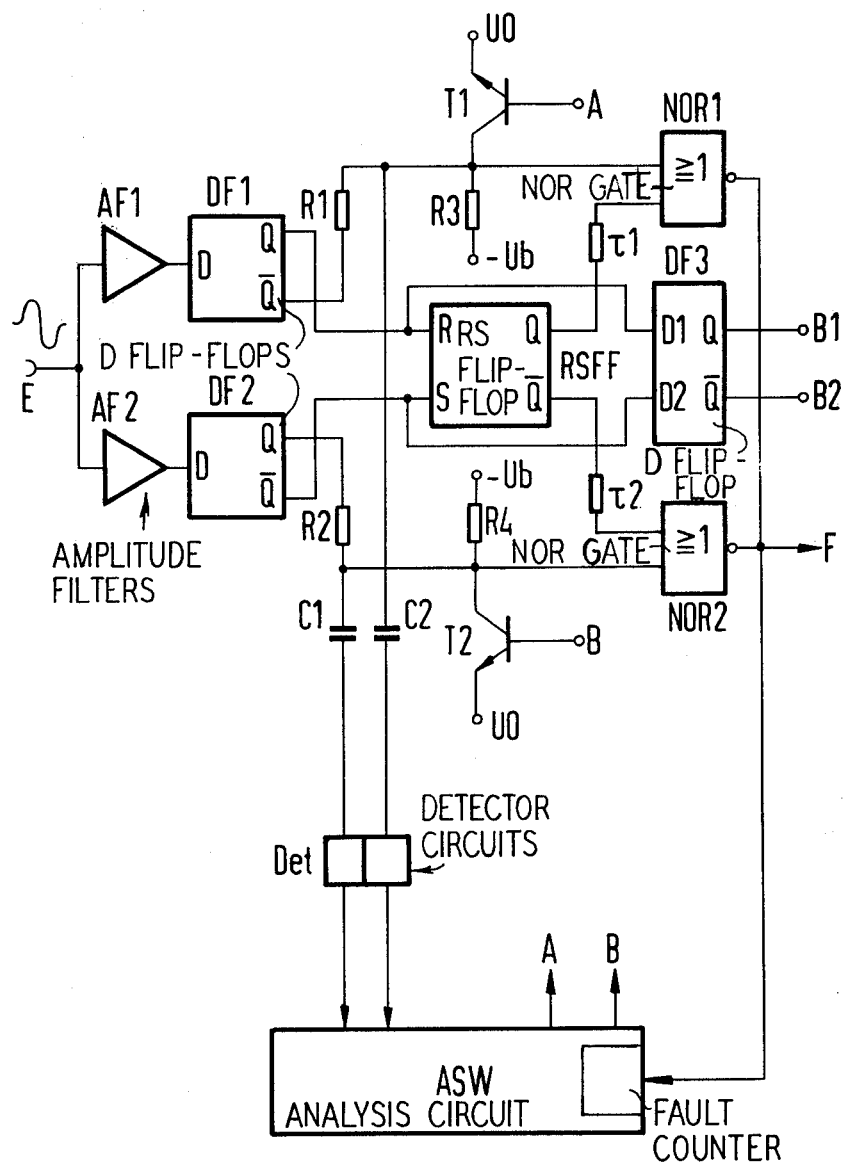
FIG. 2 is a block circuit diagram, much like FIG. 1, which illustrates a part of the regenerator of FIG. 1 having a reduced expense in the detector circuit and having a code-changing flip-flop.

That portion of a regenerator illustrated in FIG. 2 corresponds, to a great extent, to the regenerator illustrated in FIG. 1, with respect to the use of an end regenerator, however, a third D flip-flop DF3 having two inputs D1 and D2 and the two outputs B1 and B2 has been inserted. The signals which have been regenerated amplitude-wise and time-wise in the described manner by the amplitude filters and the first and second D flip-flops get a code change in the third D flip-flop. The two D inputs of this D flip-flop are logically-linked to one another by an OR function.

In addition, in the arrangement illustrated in FIG. 2, the monitoring expense has been reduced in that the third detector of the detector arrangement Det and the associated coupling capacitor C3 have been omitted. The capacitor C3 was connected to the inverting output $\overline{Q}$ of the RS flip-flop in order to be able to additionally monitor this output. It is now proved that it is possible to dispense with this monitoring facility if the checking signals occur consecutively at the terminals A and B. A signal at the terminal B alone results in the monitoring of the inverting output $\overline{Q}$ of the RS flip-flop, and a signal at the terminal A alone results in the monitoring of the corresponding non-inverting output Q.

The regenerator corresponding to FIG. 3 has been further simplified in comparison to the previously-described regenerators as a result of the omission of the detector arrangements. This was facilitated in that the inverting reset input $\overline{R}$ and the inverting set input $\overline{S}$ of the RS flip-flop have been used in place of the non-inverting inputs, and these inputs are connected to that output of the preceding D flip-flops DF1 and DF2 to which the NOR gate arrangements NOR1 and NOR2 are connected. Monitoring of the unconnected outputs of the D flip-flops is superfluous. The analysis circuit ASW is then controlled via the fault output F of the monitoring device, but program contained in the analysis circuit, and possibly by an external control unit.

Although I have described my invention by reference to particular illustrative embodiments thereof, many changes and modifications of the invention may become apparent to those skilled in the art without departing from the spirit and scope of the invention. I therefore intend to included within the patent warranted hereon all such changes and modifications as may reasonably and properly be included within the scope of my contribution to the art.

I claim:

1. An arrangement for monitoring a regenerator for pseudo-ternary digital signals of positive and negative input pulses and which produces two amplitude-wise and time-wise regenerated unipolar pulse trains one of which represents the positive input pulses and the other of which represents the negative input pulses, comprising:

an input terminal for receiving the input pulses;
   first and second D flip-flops each including a D input, a Q output and a $\overline{Q}$ output;
   amplitude filter means connecting said D inputs to said input terminal and operable to feed the positive input pulses to said first D flip-flop and the negative input pulses to said second D flip-flop;
   an RS flip-flop including an S input connected to said $\overline{Q}$ output of said second D flip-flop, an R input connected to said Q output of said first D flip-flop and Q and $\overline{Q}$ outputs for providing a push-pull output for the regenerated unipolar pulse trains, each of said pulse trains containing all of the information of the input pulses;
   first and second NOR gates each including an output connected to the like output of the other for an OR function for providing error indication signals, a first input connected to a respective output of said RS flip-flop and a second input connected to a respective output of said first and second D flip-flops;

voltage detector means connected to respective selected outputs of said first and second D flip-flops;

an analysis circuit connected to said voltage detector means and to said outputs of said NOR gates, said analysis circuit including two control signal outputs and operable to produce control signals for checking the operation of said NOR gates in response to the voltage detected; and first and second transistors each including a collector-emitter circuit connected between the respective second input of a respective NOR gate and a predetermined potential and a base connected to a respective control signal output of said analysis circuit, and operable in response to the control signals to place said second input at the predetermined potential.

2. The arrangement of claim 1, wherein: said voltage detector means is further connected to, and operable in response to the voltage at, said $\overline{Q}$ output of said RS flip-flop.

3. The arrangement of claim 1, and further comprising:
capacitive means capacitively coupling said voltage detector means to said outputs of said flip-flops.

4. The arrangement of claim 1, wherein:
said voltage detector means comprises a.c. voltage detectors.

5. The arrangement of claim 1, wherein:
said voltage detector means comprises d.c. voltage detectors.

6. The arrangement of claim 1, and further comprising:
first and second resistors;
third and fourth resistors;
said first and second resistors connected between said second inputs of said NOR gates and the respective outputs of said D flip-flops; and
said third and fourth resistors connected between an operating potential and respective collector-emitter circuits of said transistors, said first and second resistors being of smaller value than said third and fourth resistors.

7. The arrangement of claim 1, and further comprising:
a further D flip-flop including first and second inputs D1 and D2 respectively connected to said Q and $\overline{Q}$ outputs respectively of said first and second D flip-flops, and B1 and B2 outputs to recode the regenerated pulse trains.

8. The arrangement of claim 1, and further comprising:
first and second time delay elements respectively connected between said outputs of said RS flip-flop and said first inputs of said NOR gates to provide a one-bit delay over said RS flip-flop and said time delay elements.

9. An arrangement for monitoring a regenerator for pseudo-ternary digital signals of positive and negative input pulses and which produces two amplitude-wise and time-wise generated unipolar pulse trains one of which represents the positive input pulses and the other of which represents the negative input pulses, comprising:
an input terminal for receiving the input pulses;
first and second D flip-flops each including a D input, a Q output and a $\overline{Q}$ output;
amplitude filter means connecting said D inputs to said input terminal and operable to feed the positive input pulses to said first D flip-flop and the negative input pulses to said second D flip-flop;
an RS flip-flop including an S input connected to said Q output of said second D flip-flop, an R input connected to said $\overline{Q}$ output of said first D flip-flop and Q and $\overline{Q}$ outputs for providing a push-pull output for the regenerated unipolar pulse trains, each of said pulse trains containing all of the information of the input pulses;
first and second NOR gates each including an output connected to the like output of the other for an OR function for providing fault signals, a first input connected to the $\overline{Q}$ and Q outputs respectively of said RS flip-flop and a second input connected to a respective $\overline{Q}$ and Q output of said first and second D flip-flops;
an analysis circuit connected to said outputs of said NOR gates, said analysis circuit including two control signal outputs and operable to produce control signals for checking the operation of said NOR gates in response to the voltages detected; and
first and second transistors each including a collector-emitter circuit connected between the respective second input of a respective NOR gate and a predetermined potential and a base connected to a respective control signal output of said analysis circuit, and operable in response to the control signals to place said second input at the predetermined potential.

10. The arrangement of claim 9, and further comprising:
first and second resistors respectively connected between a collector emitter path of said transistors and said $\overline{Q}$ and Q outputs of said first and second D flip-flops, respectively; and
third and fourth resistors respectively connecting said collector-emitter paths to an operating voltage.

11. The arrangement of claim 9, and further comprising:
first and second time delay elements connecting said Q and $\overline{Q}$ outputs of said RS flip-flop to said NOR gates, respectively.

* * * * *